July 8, 1969      L. F. HUNT      3,454,783
HIGH VOLTAGE DC TRANSMISSION SYSTEM
Filed Jan. 26, 1968
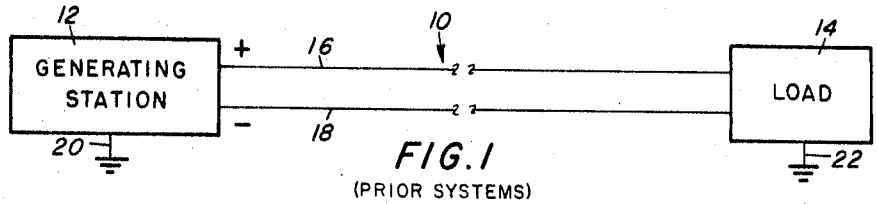
FIG.1 (PRIOR SYSTEMS)
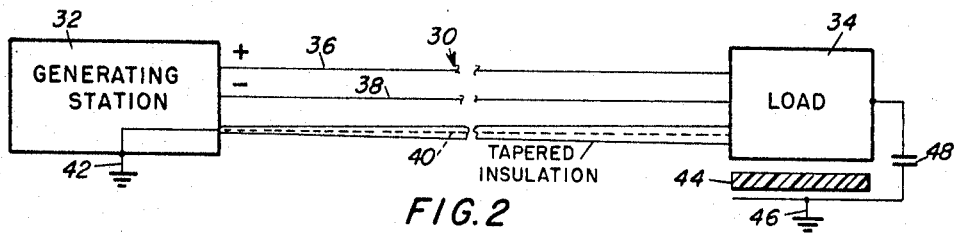
FIG.2
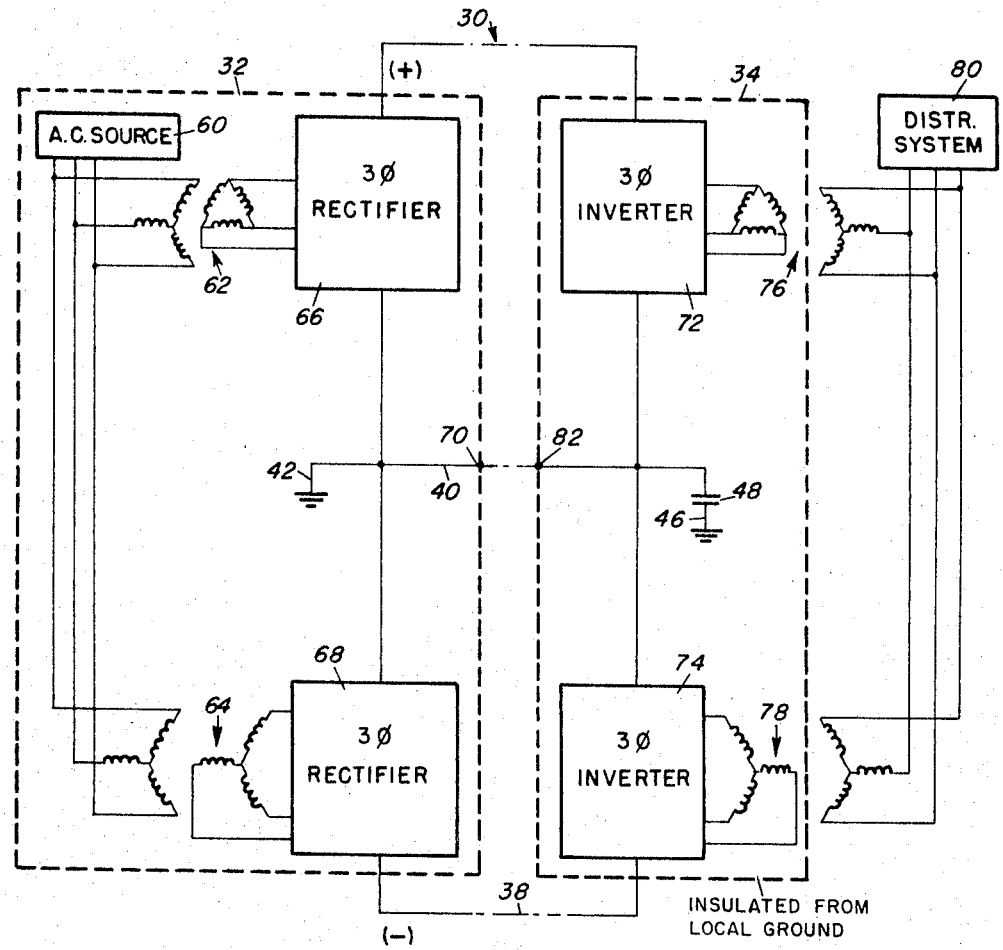
FIG.3
INVENTOR
LLOYD F. HUNT
BY Beall and Jones
ATTORNEYS 3,454,783
HIGH VOLTAGE DC TRANSMISSION SYSTEM
Lloyd F. Hunt, 221 Rocky Point Road,
Palos Verdes Estates, Calif. 90274
Filed Jan. 26, 1968, Ser. No. 700,903
Int. Cl. H02h 1/02
U.S. Cl. 307—94                                    5 Claims

ABSTRACT OF THE DISCLOSURE

A high voltage DC transmission system having a single ground connection. The system utilizes three conductors in the transmission line: a positive conductor, a negative conductor, and a ground connection conductor. All equipment at one end of the transmission system is connected to a first common point; similarly, all equipment at the other end of the system is connected to a second common point. One common point is grounded by way of an earth connection, and the other common point is connected by way of the ground connection conductor to the same earth connection. The other common point is insulated from its local ground potential.

FIELD OF THE INVENTION

The present invention relates, in general, to high voltage transmission lines which may be used to carry direct current power from a generating station to a remotely located distribution point. More particularly, the invention describes a method of grounding such systems to avoid problems inherent in prior art systems.

DESCRIPTION OF THE PRIOR ART

Transmission systems function to carry bulk electrical power to load centers from which it is delivered to consumers by way of distribution systems. At the present time, virtually all transmission of large quantities of power is by way of alternating current, most commonly three-phase, the choice having been dictated years ago by the comparative simplicity of alternating current, as opposed to direct current, systems. AC systems require only transformers to convert generated voltage to transmission levels, and then to reconvert them to the levels required by the consumer, whereas DC transmission systems have required expensive motor-generator sets to convert the system voltage levels to usable values.

However, it has long been recognized that the transmission of power by direct current would be desirable, since DC systems would have greater stability and would avoid many of the other problems inherent in AC transmission. Further, a comparison of relative conductor weight for the same maximum voltage shows that the DC system can provide important economies in the cost of transmission line construction. Therefore, there has recently been a recurrence of the interest in DC transmission systems, particularly in view of the many improvements being made in conversion equipment, which permit AC-DC-AC conversions to be effected much more economically than previously possible.

A DC transmission system would normally comprise two conductors, one positive and one negative, with the generating equipment at one end of the line and the load equipment at the other end being grounded. A 750 kv. system constructed in this manner would carry the full voltage between the conductors, while at each end the voltage between each conductor and ground would be 375 kv. The stability of the DC transmission system is demonstrated by this arrangement, for if one of the conductors should fail, the system would continue to operate between the remaining conductor and ground. And this demonstrates the difficulties in known DC transmission systems, for such a failure would produce, in a line 850 miles long having a resistance of 0.01974 ohm per mile, a ground current of approximately 2000 amperes. It will be apparent that such a ground current could present a real danger not only to personnel in the area, but to equipment.

A further difficulty with such a system becomes apparent in areas where it is difficult to obtain a good ground connection. Mountainous or rocky areas, dry stream beds or the like present this problem; therefore, the use of a DC transmission system which relies on a ground return path faces real difficulties. In these areas it is almost impossible to attain a zero resistance earth connection, and the resultant stray ground currents will attack any materials through which it flows.

SUMMARY OF THE INVENTION

It is therefore an object of the present invention to provide a high voltage DC transmission line which avoids the problems of the prior art by providing an effective and safe ground connection.

The present invention contemplates the use, in a two conductor high voltage DC transmission system, of a third, or grounding, conductor extending the length of the transmission line but having an earth connection at only one end thereof. The end of the line at which the best earth connection is available, and this will usually be the generator end, is grounded, and the other end, which may be the load end, is connected only to the third wire of the transmission line. The load end is sufficiently insulated from its local ground that the voltage drop along the length of the third wire will not break the insulation down and cause a ground current flow. Through the use of the present three-wire system, DC transmission can be adapted to existing three-wire, three-phase systems, thus permitting realization of the advantages of the present invention without the economic loss that would result from extensive modification or abandonment of existing AC transmission lines.

BRIEF DESCRIPTION OF THE DRAWINGS

The foregoing and additional features and objects of the invention will best be understood and appreciated from the following detailed description of a preferred embodiment thereof, selected for purposes of illustration and shown in the accompanying drawings in which:

FIG. 1 is a diagrammatic illustration of a prior art DC transmission system;

FIG. 2 is a diagrammatic illustration of a high voltage DC transmission system in accordance with the present invention; and FIG. 3 is a schematic diagram illustrating in further detail the ground connections of the system of the present invention.

DESCRIPTION OF A PREFERRED EMBODIMENT

Referring now to FIG. 1 of the drawings, there is illustrated at 10 a high voltage direct current transmission line of the type known to the prior art. As shown, the transmission line is utilized to carry bulk power from a generating station 12, or the like, to a load center 14, by way of positive and negative conductors 16 and 18, respectively. The generating station may comprise prime movers driving DC generators, or may comprise AC to DC converters consisting of motor-generator sets, for example.

The generated DC power passes to conductors 16 and 18, while the generating equipment, including motor, transformer and generator frames, housing, switches and the like are carefully grounded by way of earth connection 20.

The voltage applied across lines 16 and 18 may be approximately 750,000 volts, with the voltage to ground from each line being approximately 375,000 volts; the full load current in such as system approaches 2,000 amperes. Load 14 may comprise a direct current distribution system, utilizing motor-generator systems or the like to reduce the voltage to a usable value, or may consist of a DC to AC inverter system for changing the supplied power to alternating current for local distribution and use. Again, whatever configuration the load takes, all motor, transformer and generator frames and housings, all switches and, in general, all the equipment at the load end must be carefully grounded by way of earth connection 22.

As has been noted, one of the advantages of a DC transmission system is its stability, part of which is attained through continued operation of the system even if one conductor of the transmission line should fail. This continued operation is by way of the remaining conductor and the ground connections at both ends of the line, and is obtained at the expense of extremely high ground currents, with their attendant problems.

The ground currents under failure conditions are not the only problem with such systems, however. High voltage systems of the type here under consideration are almost inevitably accompanied by leakage currents of various types, and in order to protect personnel in the area, it is vital that all equipment at both the generating and load ends be well grounded. Usually there is not a great deal of difficulty in obtaining a suitable earth connection at a generating station, for such stations are normally located in areas where suitable ground connections can be made. But, it often happens that a load center must be located in a mountainous or dry area where it is extremely difficult to ground the equipment properly, and the resultant charge buildups and ground currents present a serious hazard, as well as detracting from the efficient operation of the system. If it should happen that the poor ground connection exists at the generation station instead of, or as well as, at the load center, the problem is equally severe, or compounded.

These problems are overcome by the present invention, illustrated in diagrammatic and schematic form in FIGS. 2 and 3, wherein corresponding numbers indicate similar elements. Thus, the transmission line 30 is connected between a generating station 32 and a load center 34, as before, by positive and negative conductors 36 and 38. However, the transmission line of the invention also includes a third conductor 40, which is the ground conductor for the system. The ground conductor 40 is connected to earth at whatever point in the system the best ground can be obtained; the usual connection would be at the generating station, since one of the factors in the selection of a location for such stations generally is the availability of a good earth connection. Thus, the earth connection 42 in the present invention is indicated at the generating station, although it will be apparent that if a better location is available, it should be used.

With the present system, all equipment remote from the earth connection 42 is carefully insulated from ground, and referenced by way of conductor 40 to the earth connection at 42. Thus, all equipment at load center 34 is connected to ground conductor 40 and insulated from the earth at the load center. All stray ground currents will flow in conductor 40, and if a fault should occur in either conductor 36 or conductor 38, the load current would continue to flow, but would shift from the fault conductor to the ground conductor 40. Thus, the DC system advantage of stability would remain, without the attendant dangers of high ground currents.

In order to be able to carry the fault condition load current, it is necessary that the ground conductor 40 be of the same size and current-carrying capacity as conductors 36 and 38. This would mean that in a transmission line 850 miles long of the type described in the example above, the ground conductor would exhibit a resistance of about 16 ohms. With a 2,000 ampere load current flowing through this conductor, there would be a voltage drop of 32 kv. along its length. With only one end of conductor 40 connected to earth, this means that the equipment at the opposite, or ungrounded, end would be 32 kv. above local ground potential. The equipment at the ungrounded end would, therefore, have to be insulated for 32 kv. Further, the ground conductor 40 would have to be insulated, but it could use a tapering insulation. This insulation would be designed to withstand negligible voltages at the grounded end, but would increase in dielectric strength as needed along the length of the conductor until the required strength of 32 kv. was reached at the remote end.

FIGURE 2 indicates in a schematic manner the insulation 44 required at the load end of the transmission line. The insulation is of sufficient strength to prevent current flow from ground conductor 40 to the local ground point 46. A large capacitor 48 should be connected between the insulated equipment and ground point 46 to absorb switching surges, lightning and the like, while preventing the flow of direct current.

Turning now to FIG. 3, it is seen that the generating station 32 may include, or may be fed by, a source of current, such as AC source 60. If alternating current is supplied, it may be stepped up to a suitable voltage by means of transformers 62 and 64 and converted to direct current by means of suitable rectifiers 66 and 68. Rectifier 66 is connected between ground conductor 40 and positive conductor 30, while rectifier 68 is connected between negative conductor 38 and ground conductor 40. As illustrated diagrammatically at 70, the equipment in generating station 32 is connected to the ground conductor 40, and thus to the earth connection 42.

The generated direct current is conducted through transmission line 30 to the load center 34, where the DC may conveniently be changed to alternating current by three-phase inverters 72 and 74. The outputs of the inverters may be transformed by way of respective transformers 76 and 78 to suitable AC voltage levels, for use, e.g., in a distribution system 80. As indicated diagrammatically at 82, the equipment at the load center 34 is connected to conductor 40, for grounding at earth connection 42.

Thus, there has been described an improved high voltage DC transmission system which eliminates the major problem encountered in prior systems, while providing the many known advantages of DC transmission of power. It will be apparent to those skilled in the art that modifications can be made of this system without departing from the spirit and scope of the invention. Thus, the ground point selected for a system need not be at the generating station, but may be located at the point best able to provide a suitable earth connection, whether that point be at the load center, generating station, or some intermediate point. The only requirement is that the remaining portions of the system be insulated from their local ground potentials, and that all grounds thus be referenced back to a single point.

What is claimed is:

1. A high voltage direct current transmission system comprising a generating station grounded to a first common point, a load station grounded to a second common point, and a transmission line connecting said stations, said transmission line including a positive conductor, a negative conductor, and a ground conductor, said system having a single earth connection, said ground conductor connecting said first and second common points to said single earth connection, and insulating means for insulating the remainder of said system from ground potential, whereby said ground conductor references all ground points in said system to said single earth connection.

2. The system of claim 1, wherein all equipment at said generating station is grounded to said first common point and all equipment at said load station is grounded to said second common point, one of said common points comprising said earth connection, and the other of said common points being connected by way of said ground conductor to said earth connection, said other common point being insulated from its local ground potential.

3. The system of claim 2, wherein said ground conductor is insulated, said insulation being tapered in accordance with the voltage drop along said ground conductor to a maximum value at least equal to the potential between said other common point and said local ground potential.

4. The system of claim 1, wherein said insulating means prevents the flow of direct current to ground potential at all points in said system except said single earth connection.

5. The system of claim 4, further including capacitor means connected across said insulating means for shunting current surges to ground.

References Cited

UNITED STATES PATENTS

| | | |
|---|---|---|
| 2,148,384 | 2/1939 | Verse _____ 307—147 |
| 2,866,148 | 12/1958 | Forssell _____ 321—2 |
| 2,880,377 | 3/1959 | Buckingham et al. __ 317—45 XR |
| 3,036,257 | 5/1962 | Uhlmann _____ 321—2 |
| 3,196,316 | 7/1965 | Crom _____ 317—45 XR |
| 3,395,327 | 7/1968 | Kaiser et al. _____ 321—2 |

OTHER REFERENCES

High Voltage Direct Current Power Transmission, Colin Adamson and N. G. Hingorani, pp. 21–23, 133–139, Garraway Limited, London, England, 1st Edition, 1960.

JOHN F. COUCH, *Primary Examiner.*

W. M. SHOOP, JR., *Assistant Examiner.*

U.S. Cl. X.R.

174—110; 307—103; 317—44, 45; 321—2